Patented Dec. 23, 1952

2,623,023

UNITED STATES PATENT OFFICE 2,623,023

EXPANDED, CELLULAR, RESINOUS PRODUCTS CONTAINING POLYEPOXIDES AND ACONITIC ACID

Joseph E. Koroly, Philadelphia, Pa., assignor to Rohm & Haas Company, Philadelphia, Pa., a corporation of Delaware No Drawing. Application July 28, 1951,
Serial No. 239,183

16 Claims. (Cl. 260—2.5)

1

This invention relates to new thermoset and expanded plastic materials and to a process for preparing them. It relates to a new kind of foamed, closed-cell, resinous product which is characterized by being cross-linked, hard and durable as well as by having very uniform cellular structure and very low density. Furthermore, it relates to thermoplastic molding compositions which are capable of being simultaneously molded, expanded, and converted to thermoset, expanded, cellular, resinous masses on being heated above about 140° C.

The thermoplastic, expandable, reactive molding compositions are made by intimately mixing, at a temperature up to about 140° C., aconitic acid and a particular kind of organic compound which contains two or more epoxy groups, as will be described in greater detail below. Another polycarboxylic acid containing three to six carboxyl groups is also preferably present in the moldable and expandable mixture.

The thermoset, expanded, cross-linked products of this invention are made by heating the above-described molding compositions to a temperature above about 140° C.

In the process of this invention the essential materials are aconitic acid and a polyepoxy compound. My preferred class of polyepoxy compounds which give most satisfactory results are those having the general formula

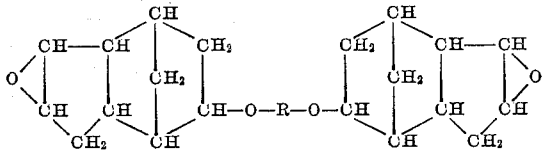

in which R is an aliphatic group containing only carbon, hydrogen, and oxygen.

Any bis-epoxy ether having the above formula reacts with aconitic acid by the process of this invention provided the group which is represented by R is an aliphatic group containing only carbon, hydrogen, and oxygen. When R is a hydrocarbon group, it can be unsaturated as well as saturated. When oxygen is present in the group R, it can be in the form of an ether-oxygen link between hydrocarbon groups or in the form of a hydroxy group. It is true that such a hydroxyl substituent in the group R can and does react by esterification with some of the aconitic acid and any other polycarboxylic acid employed, but this does not prevent these acids from reacting also with the terminal epoxy groups of the bis-epoxy ether. In fact, the additional esterification makes

2 for complexity and more cross-linking in the product. Nor does the presence of a carbonyl-oxygen atom, as in an aldehydo, keto, or carboxyl group, interfere with the reaction of this invention. The preferred bis-epoxy ethers, however, are those shown by W. D. Niederhauser in his U. S. Patent No. 2,543,419 of February 27, 1951, entitled "Polycyclic Di-Epoxy Ethers." These are preferred because the only functional groups which they contain are the two terminal epoxy groups. These ethers are actually diepoxides of glycol bis-exo-dihydrodicyclopentadienyl ethers having the general formula given above in which R is a member of the class consisting of (a) alkylene groups containing 1 to 12 carbon atoms and (b) groups of the general formula $(-R'-O)_xR'$ in which R' is an alkylene group of 2 to 4 carbon atoms and $x$ is an integer having a value of 1 to 8 inclusive. In the process of this invention reaction takes place at the two terminal epoxy groups and the remainder of the molecule including the group represented by R remains intact. Therefore, the group represented by R can vary within the limits set forth above without adversely affecting the course of the reaction. Thus, the process of this invention is applicable to the reaction of polycarboxylic acids with the diepoxides of the ethers of dicyclopentadiene and glycols which glycols are typified by the following: Ethylene glycol, diethylene glycol, the isomeric butylene glycols, hexamethylene glycol and its branched-chain isomers such as 1,2-dihydroxyhexane, octylene glycols such as 1,2-dihydroxyoctane and 1,8-dihydroxyoctane, triethylene glycol, tetrapropylene glycols, dibutylene glycols, hexabutylene glycols, and octaethylene glycols.

Another class of polyepoxy compounds which combine with aconitic acid to form thermoset, expanded, resinous products is the polyglycidyl ethers of polyhydric phenols, particularly of bis-phenols. These aromatic polyepoxy compounds are known and are well-described in U. S. Patent No. 2,500,449 which issued March 14, 1950, to Theodore F. Bradley. These polyepoxy compounds, as is well known, are made by reacting epichlorohydrin with a polyhydric phenol in alkaline solution. Reaction of the chlorine atom of the epichlorohydrin and the hydroxyl group of the polyhydric phenols results in the formation of glycidyl ethers in which a plurality of groups of the formula

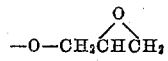

are attached directly to the aromatic nuclei. Thus, in this invention the polyglycidyl ethers are operable which are made from polyhydric mononuclear phenols such as resorcinol, catechol, hydroquinone and the like or from polynuclear phenols such as bis-(4-hydroxylphenyl)-2,2-propane; 4,4'-dihydroxy benzophenone; bis-(4-hydroxyphenyl)-1,1-ethane; bis - (4 - hydroxyphenyl)-1,1-isobutane; bis-(4-hydroxyphenyl)-2,2-butane; bis-(4-hydroxy - 2 - methylphenyl)-2,2-propane; bis-(4-hydroxy-2-tert.-butylphenyl) - 2,2-propane; bis - (2 - dihydroxynaphthyl) methane; 1,5-dihydroxynaphthalene and the like.

Still another class of polyepoxy compounds which are operable in the process of the instant invention consists of those polyglycidyl ethers made by etherifying a polyhydric alcohol with epichlorohydrin according to the disclosure in the above-identified patent to Bradley. Such ethers contain a plurality of groups of the formula

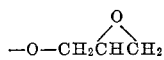

attached to the hydrocarbon radicals of the original polyhydric alcohols. The polyglycidyl ethers of the following polyhydric alcohols can all be used to form expanded resinous products by reaction with aconitic acid: Ethylene glycol, propylene glycol, trimethylene glycol, butylene glycol, diethylene glycol, triethylene glycol, glycerol, dipropylene glycol, pentaerythritol, mannitol, sorbitol, polyvinyl alcohol and the like.

Furthermore, vinylcyclohexene dioxide can be used in the instant invention.

Some monoglycidyl ethers may be present in the epoxy compounds due to the incomplete reaction of the epichlorohydrin with the dihydric phenol or alcohol but these do not appreciably affect the reaction of the polyglycidyl ethers with the aconitic acid and the second polybasic acid to form the expanded and thermoset resinous product.

While aconitic acid can be used alone and while it reacts with the polyepoxy compound to yield expanded resinous materials, it is preferred that another polycarboxylic acid be used in conjunction with the aconitic acid. For this purpose, polycarboxylic acids containing three or more carboxyl groups are employed because the resultant products are not only expanded but are more highly cross-linked and are harder by virtue of the reaction of the polyepoxy compound with both the aconitic acid and the additional acid. Furthermore, by adjustment of the ratio of the aconitic acid and the second polycarboxylic acid, castings having a wide range of densities can be made, all of which, however, are characterized by uniform cellular structure, infusibility, and durability.

The polycarboxylic acids which are used in conjunction with the aconitic acid are those which contain three or more—usually three to six—carboxyl groups. Typical of such acids are citric, tricarballylic, hemimellitic, trimellitic, and pyromellitic acids. Of greater interest, however, than these acids are those polycarboxylic acids made by reacting dicarboxylic acids or their anhydrides with polyhydric alcohols such as glycerol, pentaerythritol, dipentaerythritol, sorbitol, mannitol, and the like whereby the half-ester half-acid is formed. These ester-acids are readily prepared by reacting one mole of the polyalcohol with that number of moles of dibasic acid or anhydride which is equal to the number of hydroxyl groups in the alcohol. Thus, for example, in preparing such half-ester-acids from glycerol, one mole of glycerol is esterified with three moles of a dicarboxylic acid such as phthalic acid or preferably with three moles of an acid anhydride such as phthalic anhydride. Similarly in the case of pentaerythritol, four moles of a dicarboxylic acid or its anhydride are reacted with one mole of the tetrahydric alcohol. Furthermore, mixed ester-acids can be used together with aconitic acid such as those made by reacting a polyhydric alcohol with a mixture of dicarboxylic acids or their anhydrides, such as a mixture of phthalic and maleic anhydrides. A mixed ester-acid of this kind is that made by esterifying one mole of pentaerythritol with three moles of phthalic anhydride and one mole of maleic anhydride. This particular ester acid has the average formula

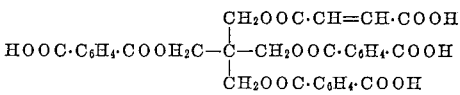

The half-ester-acids made from such alcohols as glycerol or pentaerythritol and saturated, aliphatic, dicarboxylic acids having the general formula $HOOC \cdot (CH_2)_x \cdot COOH$, in which $x$ is an integer of value 2 to 8, also are used to advantage with aconitic acid to produce expanded, thermoset, resinous products by reaction with the above polyepoxy compounds. The foamed products which are obtained by the use of these half-ester-acids are not, however, as hard as those made from the half-ester-acids of phthalic or maleic acids. Examples of such half-ester-acids are those made from glycerol, pentaerythritol, dipentaerythritol, mannitol, or sorbitol and succinic, glutaric, adipic, pimelic, suberic, azelaic, and sebacic acids.

The polyepoxy compound and aconitic acid and any second polycarboxylic acid which may be present are intimately mixed and the mixture is then heated to a temperature up to about 140° C. The result is ordinarily a clear, homogeneous molten mass which can easily be poured or pumped into a mold for further conversion to the expanded and cross-linked condition. Alternatively, the original mixture can be placed in a mold and cured to the final expanded condition therein. The molten mixture which has been prepared up to about 140° C. can be cooled to a uniform, solid, resinous mass which can be stored or shipped as such. Also, it can be converted into a molding powder and then blended with modifying materials such as fillers, release-agents, pigments, and the like.

In order to convert the reaction mixture into an expanded mass, it is heated above about 140° C. but below its charring or decomposition point. As the temperature is raised, the reactants continue to combine chemically. Between about 140° C. and 160° C. the reaction mixture begins to expand in volume. Temperatures up to 250° C. have been used but those from about 150° C. to about 200° C. are preferred. Under these preferred conditions, the reaction is fairly rapid and complete between the polyepoxy compound and the aconitic acid and any other polycarboxylic acid which may be present and as a result the expanded product does not contain extractable materials but is hard, thermoset, and unusually uniform as regards the size and distribution of the cells or voids.

During the preparation of the products of this invention it is believed that the carboxyl groups of aconitic acid as well as those of the other polycarboxylic acids react with the epoxy groups in the polyepoxy compounds to first form hydroxy esters in this way:

(1) 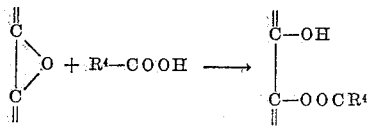

Thus, it is preferred that the polycarboxylic acids, including the aconitic acid, and the polyepoxy compound be reacted in such a ratio as to provide one carboxyl group for each epoxide group. While it is preferred to react the polyepoxy compound and polycarboxylic acid in the above ratio, it is true, however, that additional quantities of acid react to esterify the hydroxyl groups shown in the product of the equation above. The secondary reaction takes the following course:

(2) 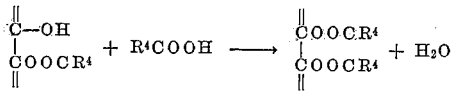

In view of the secondary reaction, the amount of aconitic acid alone or the amount of aconitic acid together with that of the second polycarboxylic acid which can react is actually that amount which provides two carboxyl groups for each epoxy group in the polyepoxy compound. As the amount of acid is raised from the preferred ratio required by Equation 1 to that required by Equation 2, the physical properties of the products change slightly and, for example, the foamed product increases in hardness. Alternatively, even a lower amount of the acids can be employed than that required by Equation 1 above. That is to say, an excess of the polyepoxy compound can be employed, and up to a certain point the presence of this excess of ether does not exert a significantly deleterious effect on the product. Therefore, the polycarboxylic acids, including the aconitic acid, and the polyepoxy compound can be employed in such amounts as to provide from about 0.7 to about 2.0 carboxyl groups in the acid for each epoxy group in the polyepoxy compound.

A foamed product is obtained when as little as 2% of aconitic acid, based on the total weight of the acids, is employed. And the amount of foaming increases with the amount of aconitic acid up to the point where aconitic acid alone is reacted with the polyepoxy compound. Actually for the production of expanded products for commercial use as insulation and the like, it is desirable that at least about 10% of the second polycarboxylic acid, based on the total weight of the acids, be used in conjunction with the aconitic acid. That is to say, those foamed products are much more valuable which are made from a combination of aconitic acid and a second polycarboxylic acid such as is described above, in which combination the amount of aconitic acid is from 2% to 90%, and preferably from 5% to 50%, of the total acids by weight.

Thus, this invention embraces, in addition to the foamed products made from the polyepoxy compounds and aconitic acid alone, the modified—and generally improved—expanded compositions made by heating to a temperature above about 140° C., and preferably from 150° C. to 200° C., a mixture of (a) a polyepoxy compound as described above, (b) aconitic acid, and (c) a polycarboxylic acid containing at least three carboxyl groups as described above, the amount of the aconitic acid being from 2% to 90%, and preferably from 5% to 50% of the total acids by weight, and the total amount of the acids being that which provides from 0.7 to 2.0 carboxyl groups for each epoxy group present in said polyepoxy compound.

The foamed products of this invention can be modified, if desirable, by the addition of pigments, fillers, or dyes to the reaction mixture prior to its being expanded by heating. Similarly, softening agents or plasticizers such as high-boiling monomeric esters, typified by dibutyl phthalate and tricresyl phthalate, or epoxidized vegetable oils can be incorporated, although at present the need is for the hardest, most chemical-resistant and heat-resistant, expanded plastics rather than for softer and weaker products.

Catalysts have been added to the reaction mixtures of this invention in order to accelerate the formation of the resinous products. In general, acidic agents such as butyl and cresyl diacid phosphates are the most satisfactory to date.

The following examples serve to illustrate how the products of this invention are prepared.

*Example 1*

A mixture was made of three parts of aconitic acid and ten parts of the diepoxide of the diethylene glycol ether of dicyclopentadiene having the following formula

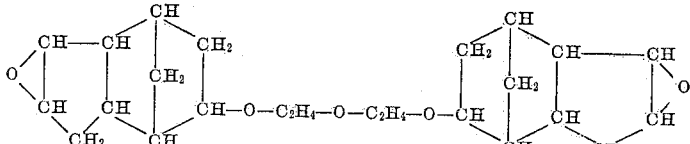

The mixture was stirred and heated to 140° C. at which point it was a clear, homogeneous liquid. The liquid mixture was poured into a mold and heated to 150° C. Within 20 minutes at 150° C. the entire mass had expanded to several times its original volume. The expanded resinous material was held at 150° C. for two hours and then cooled. The product at room temperature was dry and solid and had a uniform cellular structure. The density of the foamed mass was 0.150 g./cc.

*Example 2*

A mixture was made of 1.5 parts of aconitic acid, 10 parts of the same bis-epoxy ether as was employed in Example 1, and 3.6 parts of pentaerythrityl tetraacid trimaleate monophthalate having the formula

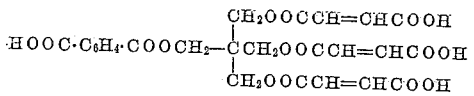

As in Example 1 this mixture was liquefied by being stirred and heated to 140° C. It was poured into a mold and heated to 150° C. As in Example 1 above, the mixture foamed completely within 20 minutes after which it was held for two hours at 150° C. and finally cooled. The product was a uniformly expanded resinous mass of density 0.141 which was insoluble in common solvents and which was not deformed when heated to 250° C.

*Example 3*

The same procedure described in Example 2 was followed here except that the amount of the pentaerythrityl ester-acid was doubled to 7.2 parts. The product was thermoset, uniformly expanded, and had a density of 0.146 g./cc.

Examples 4–6

The mixtures listed below were heated to 140° C. and poured into aluminum molds. The molds were then heated to 160° C. All foaming ended in 20 minutes. Thereafter the foamed masses were held at 160° C. for two hours and then cooled. Each foamed mass was of uniform cellular structure although the size of the cells varied from one resin to another. All of the products were thermoset and very strong as compared with foamed polystyrene. The expanded resins adhered very tenaciously to the aluminum mold and the adhesion to the metal was greater than the cohesiveness of the expanded resin. This adhesion of the foam to a metal container is of real advantage for some industrial applications.

|  | A | B | C |
|---|---|---|---|
| Aconitic acid | 0.75 part | 0.75 part | 0.75 part. |
| Pentaerythrityl tetraacid trimaleate monophthalate | 3.6 part | 3.6 part | 3.6 part. |
| Diepoxide of bis-exo-dihydrodicyclopentadienyl ether of: |  |  |  |
| Diethylene glycol | 5.0 part |  |  |
| Ethylene glycol |  | 4.5 part |  |
| Propylene glycol |  |  | 4.6 part. |
| Density of product (g./cc.) | 0.104 | 0.202 | 0.142. |
| Size of cells | Largest | Smallest | Intermediate. |

Examples 7–13

A mixture was made of 70 parts of the diepoxide employed in Example 1 above and 50.4 parts of the tetracarboxylic acid employed in Example 2 above. This was divided in seven equal portions and to six of these portions was added aconitic acid in varying amounts as shown in the table below wherein the amount of aconitic acid is expressed as its percentage of the total weight of the aconitic acid and the tetracarboxylic acid. The mixtures were heated to 140° C. and liquefied and the resultant fluids were poured into molds and were heated to 160° C. Foaming, in all cases, began in about five minutes and all mixtures were fully expanded within ten minutes. The foamed masses were all held at 160° C. for three more hours after which they were cooled. Even at 160° C. the expanded masses were dry, firm, and strong. The various products had the following densities and were made with the tabulated amounts of aconitic acid:

| Percent aconitic acid | Density of product (g./cc.) |
|---|---|
| 0 | 1.28 |
| 10 | .113 |
| 19 | .096 |
| 32 | .073 |
| 42 | .065 |
| 49 | .061 |
| 55 | .051 |

Example 14

A large block of expanded plastic was made by the procedure of Examples 7–13 above. The reaction mixture consisted of 65 parts of the bisepoxy ether, 46 parts of the tetracarboxylic acid and 29 parts of aconitic acid. The cooled, cured, thermoset cellular product had a density of 0.139 g./cc. or 8.7 lbs./cu. ft. Its compressive strength was 150 lbs./sq. in. and the compressive heat distortion temperature, under a load of 15 lbs./sq. in., was 130° C. for 1% deformation.

Example 15

A mixture of 50 parts of the diepoxy ether employed in Example 1, 16 parts of citric acid, and 15 parts of aconitic acid was stirred and heated to 140° C. The molten mixture was poured into an aluminum mold and was heated at 160° C. for two hours and twenty minutes. Foaming began after five minutes at 160° C. and reached its maximum volume within twenty minutes. The cooled product had a density of 0.146 g./cc., was thermoset, and adhered tenaciously to the metal mold.

Example 16

A mixture was made of 10 parts of the diepoxide from epichlorohydrin and bis-(4-hydroxyphenyl)-2,2-propane, having the formula

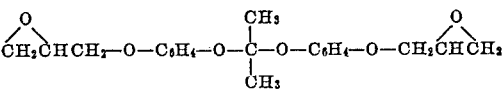

six parts of pentaerythrityl tetraacid trimaleate monophthalate having the formula

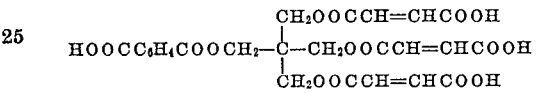

and four parts of aconitic acid. The mixture was heated to 140° C. at which point it was a homogeneous, molten, resinous mass. It was poured into a hot mold at 160° C. The mass foamed rapidly and after 20 minutes at 160° C. had expanded to its maximum volume. The foamed mass was held at 160° C. for an additional period of three hours during which time it became hard and thermoset. The foamed product on cooling had a density of 0.23 gram per cubic centimeter.

Example 17

A mixture of 3.5 parts of vinylcyclohexene dioxide and 4.3 parts of aconitic acid was stirred and heated. At 40° C. an exothermic reaction started and the temperature rose rapidly to 140° C. This rise in temperature was accompanied by foaming of the mixture and the foamed mass was held at 160° C. for two hours during which it converted to a hard, thermoset, light-colored expanded resinous mass.

In a similar experiment, half of the aconitic acid was replaced by pentaerythrityl tetraacid trimaleate monophthalate. The product was harder and denser than the product made from aconitic acid alone but had an equally uniform cellular structure.

Examples 18–26

A polyglycidyl ether of glycerol was prepared by the process described in U. S. Patent No. 2,500,449 to Bradley. Thus, 276 parts of glycerol were mixed with 828 parts of epichlorohydrin and to this mixture were added 10 parts of a 4.5% solution of boron trifluoride in diethyl ether. The temperature was maintained between 50° C. and 70° C. for three hours. Then 370 parts of the resulting glycerol-epichlorohydrin condensate were dissolved in 900 parts of dioxane containing 300 parts of sodium aluminate and the solution was stirred and refluxed for nine hours. The cooled product was then filtered and the low-boiling substances were removed by distillation to a temperature of 205° C. at 20 mm. pressure. The epoxy ether was then isolated as a pale yellow, viscous liquid.

This epoxy ether was reacted with aconitic acid in various ratios and with aconitic acid and other polycarboxylic acids. In every case the polyepoxy ether and aconitic acid, and the second acid if present, were mixed and heated to 140° C. and the resultant molten masses were then poured into molds which were heated in an oven for two hours at 150°-160° C. The ratios of reactants and the nature of the products are tabulated below. In the tabulation the equivalent weight of the polyepoxy ether is taken as 148.7 and is that weight which provides one mole of epoxy oxygen since the polyepoxy ether has a molecular weight of 324 and an average of 2.18 epoxy groups per molecule. In a similar way, the equivalent weight of the aconitic acid and of the second acid is that weight which provides one mole of carboxyl group and is calculated by dividing the molecular weight of the acid by the number of carboxyl groups in the acid. Thus, the equivalent weight of aconitic acid is 58.0.

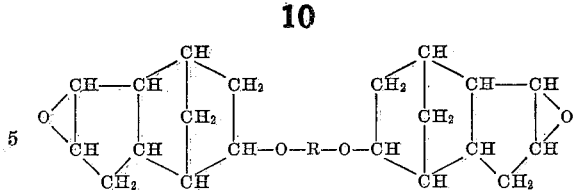

in which R is an aliphatic radical containing only carbon, hydrogen, and oxygen, the amount of the aconitic acid being that which provides 0.7 to 2 carboxyl groups for each epoxy group in said polyepoxy compound, placing said liquefied mixture in a mold and further heating said mixture in said mold at a temperature from about 150° C. to about 200° C.

3. A process for preparing expanded, cellular, resinous products which comprises heating, at a temperature up to about 140° C. to liquefy, a solvent-free mixture of (a) aconitic acid and (b) a polyepoxy compound of the class consisting of vinylcyclohexene dioxide, a polyglycidyl ether of

| Ex. | No. of equivs. of triglycidyl glycerol | No. of equivs. of aconitic acid | Second acid | Equiv. weight of second acid | No. of equivs. of second acid | Density of product in lbs./cu. ft. | Appearance of product |
|---|---|---|---|---|---|---|---|
| 18 | 1.0 | 1.0 | None | | | 4.86 | Spongy foam. |
| 19 | 1.0 | 2.0 | do | | | 13.55 | Hard, rigid foam. |
| 20 | 1.0 | .7 | do | | | 7.15 | Spongy foam. |
| 21 | 1.0 | .2 | Pentaerythrityl tetraacid trimaleate monophthalate. | 144.5 | 0.8 | 18.35 | Hard, rigid foam. |
| 22 | 1.0 | .5 | Glyceryl triacid maleate | 128.7 | .5 | 15.22 | Do. |
| 23 | 1.0 | .5 | Tricarballylic acid | 58.7 | .5 | 4.25 | Spongy foam. |
| 24 | 1.0 | .5 | Glyceryl triacid phthalate | 178.7 | .5 | 11.0 | Tough, firm foam. |
| 25 | 1.0 | .5 | Pentaerythrityl tetraacid dimaleate diphthalate. | 157 | .5 | 15.4 | Hard, rigid foam. |
| 26 | 1.0 | .5 | Pentaerythrityl tetraacid maleate. | 132 | .5 | 20.19 | Do. |

This application is a continuation-in-part of my former applications Serial Nos. 195,460, filed November 13, 1950, and 200,697, filed December 13, 1950, both of which are now abandoned.

I claim:

1. A process for preparing expanded, cellular, resinous products which comprises heating, at a temperature up to about 140° C. to liquefy, a solvent-free mixture of (a) aconitic acid and (b) a polyepoxy compound of the class consisting of vinylcyclohexene dioxide, a polyglycidyl ether of a polyhydric phenol, a polyglycidyl ether of a polyhydric alcohol, and a diepoxide of a glycol bis-exo-dihydrodicyclopentadienyl ether which has the formula

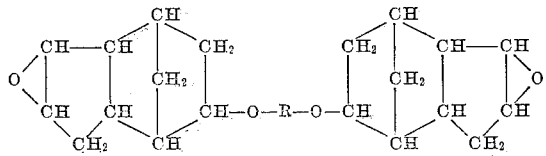

in which R is an aliphatic radical containing only carbon, hydrogen, and oxygen, the amount of the aconitic acid being that which provides 0.7 to 2 carboxyl groups for each epoxy group in said polyepoxy compound, placing said liquefied mixture in a mold and further heating said mixture in said mold at a temperature from about 150° C. to about 250° C.

2. A process for preparing expanded, cellular, resinous products which comprises heating, at a temperature up to about 140° C. to liquefy, a solvent-free mixture of (a) aconitic acid and (b) a polyepoxy compound of the class consisting of vinylcyclohexene dioxide, a polyglycidyl ether of a polyhydric phenol, a polyglycidyl ether of a polyhydric alcohol, and a diepoxide of a glycol bis-exo-dihydrodicyclopentadienyl ether which has the formula a polyhydric phenol, a polyglycidyl ether of a polyhydric alcohol, and a diepoxide of a glycol bis-exodihydrodicyclopentadienyl ether which has the formula

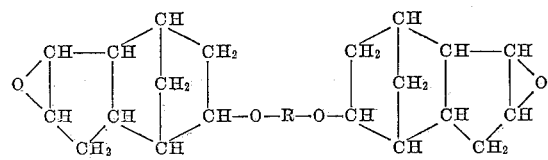

in which R is an aliphatic radical containing only carbon, hydrogen, and oxygen, and (c) another polycarboxylic acid containing 3 to 6 carboxyl groups, the total amount of aconitic acid and said other polycarboxylic acid being that which provides 0.7 to 2 carboxyl groups for each epoxy group present in said polyepoxy compound, and said aconitic acid being present in an amount equal to 2% to 90% of the total weight of said acids, placing said liquefied mixture in a mold and further heating said mixture in said mold at a temperature from about 150° C. to about 250° C.

4. A process for preparing expanded, cellular, resinous products which comprises heating, at a temperature up to about 140° C. to liquefy, a solvent-free mixture of (a) aconitic acid and (b) a polyepoxy compound of the class consisting of vinylcyclohexene dioxide, a polyglycidyl ether of a polyhydric phenol, a polyglycidyl ether of a polyhydric alcohol, and a diepoxide of a glycol bis-exodihydrodicyclopentadienyl ether which has the formula

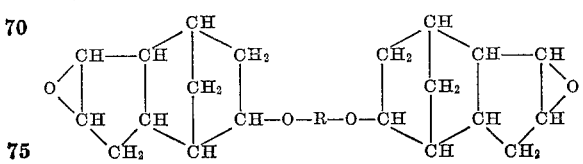

in which R is an aliphatic radical containing only carbon, hydrogen, and oxygen, and (c) another polycarboxylic acid containing 3 to 6 carboxyl groups, the total amount of aconitic acid and said other polycarboxylic acid being that which provides 0.7 to 2 carboxyl groups for each epoxy group present in said polyepoxy compound, and said aconitic acid being present in an amount equal to 5% to 50% of the total weight of said acids, placing said liquefied mixture in a mold and further heating said mixture in said mold at a temperature from about 150° C. to about 250° C.

5. A process for preparing expanded, cellular, resinous products which comprises heating, at a temperature up to about 140° C. to liquefy, a solvent-free mixture of (a) aconitic acid, (b) the bis-epoxy ether which has the formula

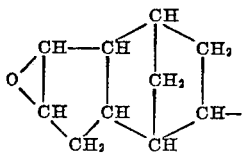

and (c) pentaerythrityl tetraacid maleate phthalate, the total amount of said acids being that which provides 0.7 to 2 carboxyl groups for each epoxy group in said bis-epoxy ether and said aconitic acid being present in an amount equal to 5%–50% of the total weight of the acids, placing said liquefied mixture in a mold and further heating said mixture in said mold at a temperature from about 150° C. to about 200° C.

6. A process for preparing expanded, cellular, resinous products which comprises heating, at a temperature up to about 140° C. to liquefy, a solvent-free mixture of (a) aconitic acid, (b) the diepoxide which has the formula

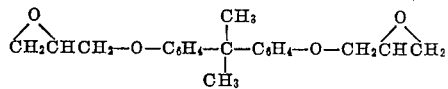

and (c) pentaerythrityl tetraacid maleate phthalate, the total amount of said acids being that which provides from 0.7 to 2.0 carboxyl groups for each epoxy group in said diepoxide, and said aconitic acid being present in an amount equal to 5% to 50% of the total weight of the acids, placing said liquefied mixture in a mold and further heating said mixture in said mold at a temperature from about 150° C. to about 200° C.

7. A process for preparing expanded, cellular, resinous products which comprises heating, at a temperature up to about 140° C. to liquefy, a solvent-free mixture of (a) aconitic acid, (b) vinylcyclohexene dioxide and (c) pentaerythrityl tetraacid maleate phthalate, the total amout of said acids being that which provides from 0.7 to 2.0 carboxyl groups for each epoxy group in said dioxide, and said aconitic acid being present in an amount equal to 5% to 50% of the total weight of the acids, placing said liquefied mixture in a mold and further heating said mixture in said mold at a temperature from about 150° C. to about 200° C.

8. A process for preparing expanded, cellular, resinous products which comprises heating, at a temperature up to about 140° C. to liquefy, a solvent-free mixture of (a) aconitic acid, (b) a polyglycidyl ether of glycerol and (c) pentaerythrityl tetraacid maleate phthalate, the total amount of said acids being that which provides from 0.7 to 2.0 carboxyl groups for each epoxy group in said polyglycidyl ether and said aconitic acid being present in an amount equal to 5% to 50% of the total weight of the acids, placing said liquefied mixture in a mold and further heating said mixture in said mold at a temperature from about 150° C. to about 200° C.

9. A process for preparing expanded, cellular, resinous products which comprises heating, at a temperature up to about 140° C. to liquefy, a solvent-free mixture of (a) aconitic acid, (b) a polyglycidyl ether of glycerol and (c) glyceryl triacid maleate phthalate, the total amount of said acids being that which provides from 0.7 to 2.0 carboxyl groups for each epoxy group in said polyglycidyl ether and said aconitic acid being present in an amount equal to 5% to 50% of the total weight of the acids, placing said liquefied mixture in a mold and further heating said mixture in said mold at a temperature from about 150° C. to about 200° C.

10. An expanded, cellular, resinous composition as prepared by the process of claim 1.

11. An expanded, cellular, resinous composition as prepared by the process of claim 3.

12. An expanded, cellular, resinous composition as prepared by the process of claim 5.

13. An expanded, cellular, resinous composition as prepared by the process of claim 6.

14. An expanded, cellular, resinous composition as prepared by the process of claim 7.

15. An expanded, cellular, resinous composition as prepared by the process of claim 8.

16. An expanded, cellular, resinous composition as prepared by the process of claim 9.

JOSEPH E. KOROLY.

REFERENCES CITED

The following references are of record in the file of this patent:

UNITED STATES PATENTS

| Number | Name | Date |
| --- | --- | --- |
| 2,569,920 | Buck et al. | Oct. 2, 1951 |